C. T. ROGERS.
POWER TRANSMISSION MECHANISM.
APPLICATION FILED JULY 9, 1917. RENEWED JULY 21, 1920.

1,369,051.

Patented Feb. 22, 1921.
2 SHEETS—SHEET 1.

Inventor
Clarence T. Rogers
By his Attorneys
Kerr Page Cooper & Hayward

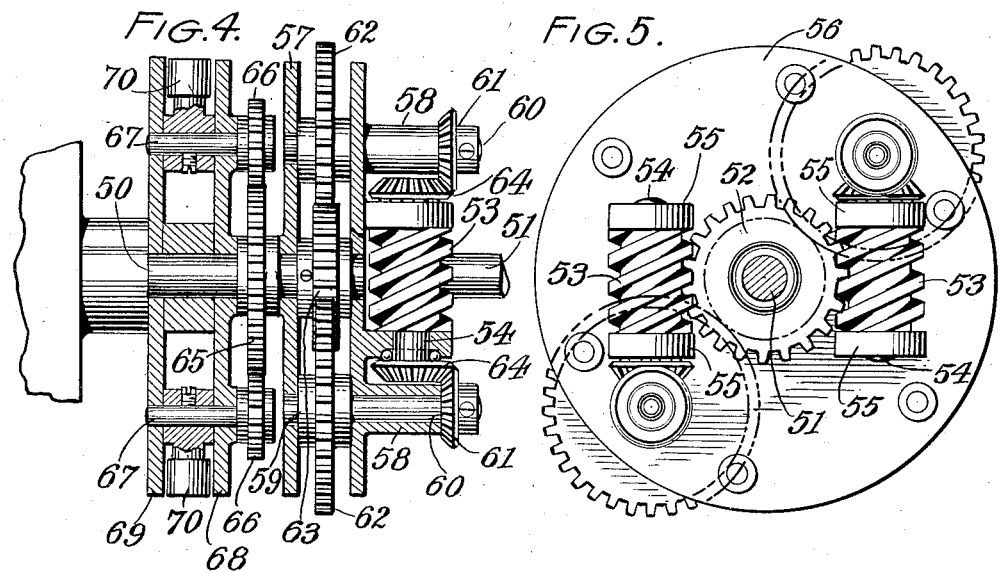
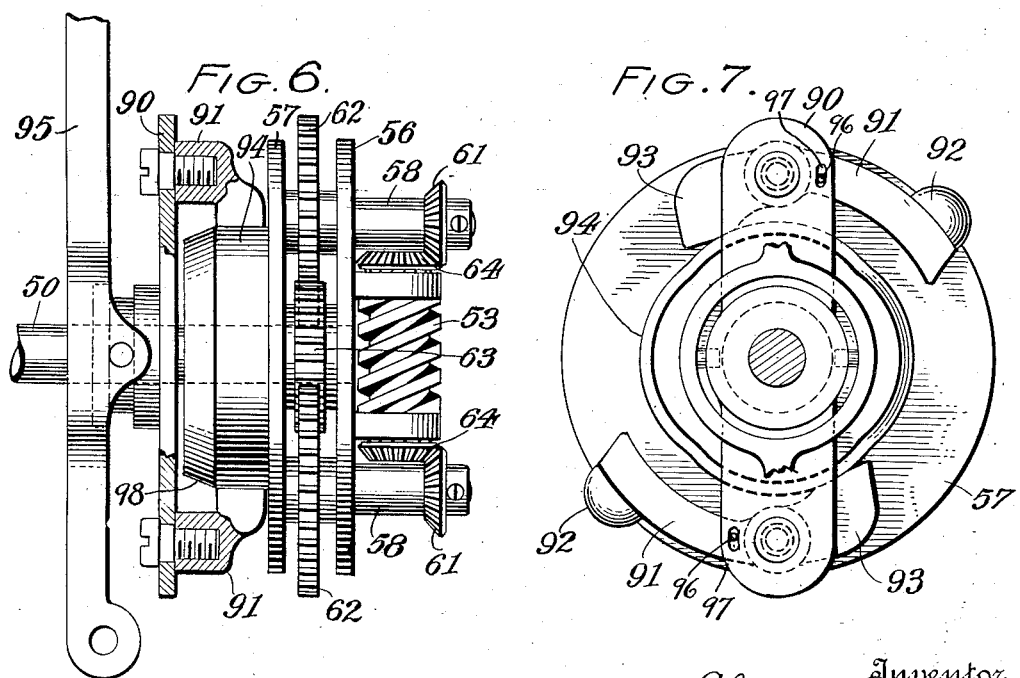

UNITED STATES PATENT OFFICE.

CLARENCE T. ROGERS, OF NEW YORK, N. Y., ASSIGNOR OF ONE-HALF TO ENRIQUE J. CONILL, OF HABANA, CUBA.

POWER-TRANSMISSION MECHANISM.

1,369,051.            Specification of Letters Patent.     Patented Feb. 22, 1921.

Application filed July 9, 1917, Serial No. 179,352. Renewed July 21, 1920. Serial No. 398,045.

*To all whom it may concern:*

Be it known that I, CLARENCE T. ROGERS, a citizen of the United States, residing at New York, in the county and State of New York, have invented certain new and useful Improvements in Power-Transmission Mechanism, of which the following is a full, clear, and exact description.

The invention which constitutes the subject matter of this application is in the nature of an improvement upon my copending application Serial No. 70,748, filed January 7, 1916, and relates to an improved power transmitting device which is so constructed that it will allow "slip" between the drive and driven shafts when the load on the latter becomes excessive. One of the many uses to which my invention may be put is in relation to automobiles, and for the purposes of description I shall refer to it in this connection, as this will amply suffice to elucidate the principles of my invention.

When the driving load of an autotmobile is excessive there is a tendency to stall the engine and in order to prevent this the operator releases the clutch connecting the engine and the shaft driven thereby so as to enable the engine to regain speed. My improved power transmission device, when employed in connection with an automobile, serves automatically to allow slip to occur when the load becomes excessive. Therefore at any speed of the engine the power derived at that speed will be transmitted to the driven shaft to drive the same at a speed proportional to the load put upon the driven shaft. This operation is entirely automatic, requiring no attention on the part of the operator.

These and other objects and advantages will more fully appear from the detailed description below taken in connection with the accompanying drawings, in which—

Fig. 4 is a longitudinal section of a modified form of my invention.

Fig. 5 is an end view of the construction illustrated in Fig. 4.

Fig. 6 is a side view, partly in section, of a still further modification of my invention.

Fig. 7 is an end view of the construction illustrated in Fig. 6.

Figure 1:
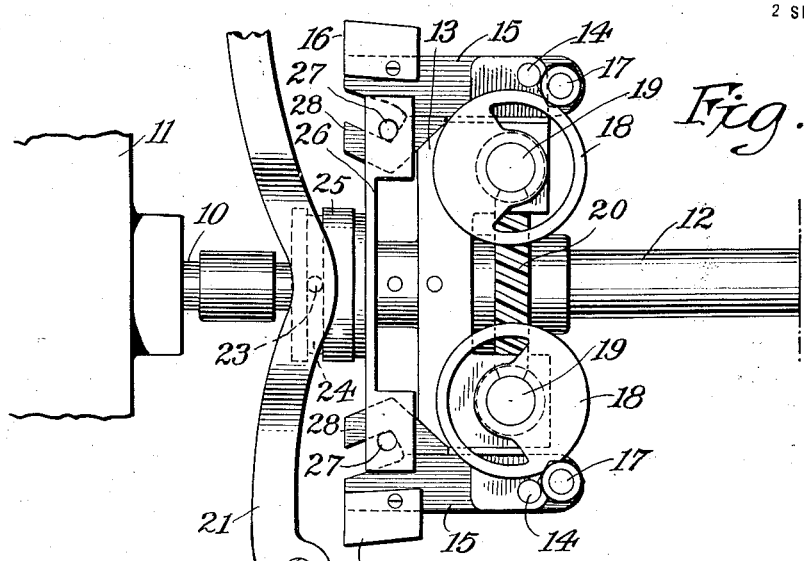
Figure 1 is a side view of the device.
Figure 2:
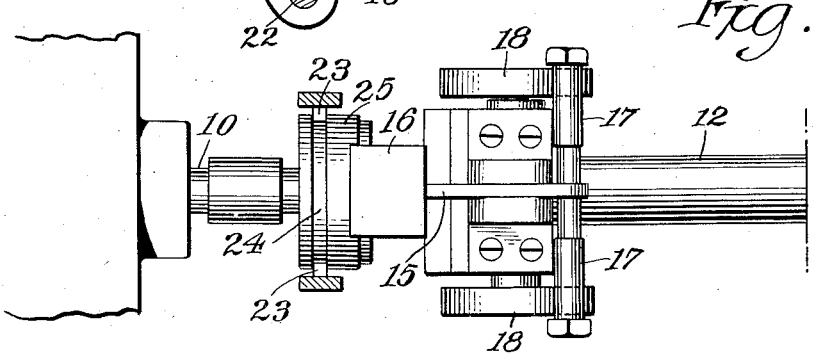
Fig. 2 is a top plan view of the construction illustrated in Fig. 1.
Figure 3:
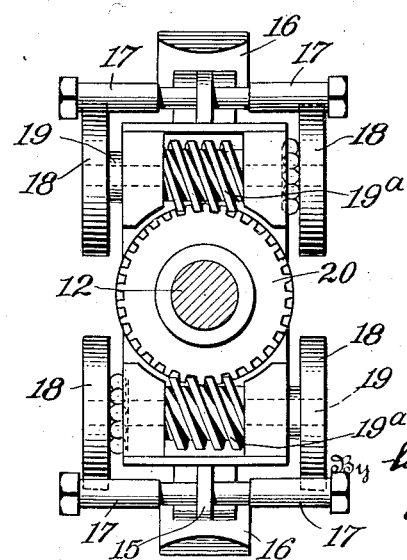
Fig. 3 is an end view of the same.

In Figs. 1, 2 and 3 of the drawings, the reference character 10 is a driving shaft which may be connected, in any desired manner, with a suitable source of power, such as a gas-engine 11. The driving shaft 10 is connected by means of my novel transmission mechanism with the driven shaft 12, which extends rearwardly to the differentials (not shown) of the automobile. The transmission mechanism proper comprises a member 13 fixed upon the driving shaft 10, upon the opposite ends of which are pivotally mounted at 14 levers 15, upon one of the ends of which are mounted the weights 16 and upon the other ends of which are mounted the friction members 17 which are adapted to engage the friction wheels 18 fixed upon the ends of the worm shafts 19, the latter being transversely arranged with respect to the driving and driven shafts and rotatably secured in the member 13. The pivots 14, levers 15, weights 16, friction members 17, friction wheels 18, worm shafts 19 and worms 19[a] are carried by the member 13, which, as previously stated, is fixed to the driving shaft 10. It will therefore be understood that for each revolution of the driving shaft one revolution is imparted to so much of the transmission mechanism as is secured to said driving shaft, that is to say, that portion of the mechanism just described. Fixed upon the driven shaft 12 is a worm gear 20, which is always in mesh with the worms 19[a]. In connection with the transmission mechanism just described I provide a clutch to enable me to positively disconnect the driving and driven shafts at will. This clutch comprises a lever 21 pivoted at 22 and straddling the shaft 10 and provided with pins 23 which engage a groove 24 in the wheel 25, which is rotatably mounted and longitudinally movable upon the driving shaft 10. To this wheel 25, and movable as a unit with the same, is secured an arm 26 projecting an equal distance in opposite directions from the shaft 10. Upon the outer ends of this arm 26 are mounted the transverse pins 27 adapted, when the wheel 25 and arm 26 are moved to the left as viewed from Figs. 1 and 2, to engage the cam members 28 and move the left ends of levers 15 inwardly.

The operation of the device illustrated in Figs. 1, 2 and 3 will now be readily understood. The operation of the engine imparts rotary movement to the shaft 10, and in unison therewith a revolutionary movement of the parts 13, 14, 15, 16, 17, 18 and 19. So long as the shaft 12 is stationary the worm wheels 19, together with the friction wheels 18, must rotate about their respective axes since said worms 19 are enmeshed with the stationary gear 20. The revolution of said parts causes the levers 15 to swing outwardly under the centrifugal action of the weights 16. This in turn causes the friction elements 17 to press against the friction wheels 18 with a force proportional to the speed of the engine until the resistance offered by the driven shaft 12 is overcome. It will therefore be clear that the speed of the driven shaft in proportion to the speed of the driving shaft is dependent upon the load or resistance of the said driven shaft. It will of course be understood that the operative relationship between the driving and driven shafts is established only when the clutch elements are in the position indicated in Figs. 1 and 2 but when moved to the left the weighted ends of the lever 15 will be drawn inwardly and the friction members 17 moved outwardly away from the friction wheels 18.

In Figs. 4 and 5 I have illustrated an alternative form in which the driving shaft is indicated by the reference numeral 50 and the driven shaft by 51. The driven shaft is provided with a worm gear 52 fixed thereon. This gear 52 meshes with worms 53 mounted upon shafts 54 which are provided with suitable bearings 55 mounted upon a plate 56 and a companion plate 57 is provided which is rigid therewith and located in juxtaposition thereto. These plates are rotatably mounted upon the driving shaft. The plate 56 is also provided with bearings 58 which are parallel to the axes of the driving and driven shafts and corresponding bearings 59 are provided in the plate 57. Journaled in these bearings 58 and 59 are the shafts 60 to the outer end of which are rigidly secured the miter gears 61 and to that portion of these shafts located between the two plates 56 and 57 are rigidly secured the spur gears 62 which mesh with the spur gear 63 rigidly secured to the driving shaft 50. The bevel gears 61 mesh with the bevel gears 64 mounted upon one of the ends of the shafts 54. Mounted upon the driving shaft and rotatable relative thereto is a spur gear 65 which meshes with a plurality of pinions 66 rigidly secured upon the shafts 67 which are journaled in bearings mounted upon the plates 68 and 69 similar to the bearings in plates 56 and 57. Rigidly secured to the shafts 67 between the plates 68 and 69 are centrifugal members 70.

From the foregoing it will be obvious that the principles of operation of the alternative form just described is the same as those involved in connection with the operation of Figs. 1, 2 and 3 in so far as it employs worms and and worm gear to transmit the driving force. In this case, however, the worms are carried upon plates or flanges which slip relatively to the driving shaft, and this construction is preferably employed where the speed reduction of the worms is desirable, it being understood that the worms in this alternative construction rotate at a very reduced speed as compared with those in Figs. 1, 2 and 3. This obviously avoids excessive wear where the speed, say of the engine, is very high.

The action of the mechanism illustrated in Figs. 4 and 5 is as follows: All of the parts, with the exception of the worm gear 52 are mounted upon the driving shaft. If now the latter is rotated the gear 63 would obviously tend to rotate the disks 56 and 57 carrying with it the system of gears and worms previously described if, at any point in this system, two of its members become relatively locked. If this system, being locked, were rotated with the driving shaft then the worm gear 52 meshing with the two worms 53, would necessarily rotate as a unit with the others and thus transmit the force applied at the driving end to the driven end and at the same relative speed. If now the resistance of the driven member overcomes the locking inertia of the gear system then the disks 56 and 57 will rotate backward, that is in a direction opposite to the direction of the driving shaft, and in doing so will carry the entire system backward with it, but as the worms will now have two rotary motions, one about their several axes and one about that of the worm gear, the rate of motion imparted to this gear will be the resultant of the rates imparted to the others.

In order to vary the rate of speed and the amount of torque of the driven shaft the slippage of the planetary system must be controlled automatically, and this is accomplished in the following manner. The weights 70 (see Fig. 4) are rotated around with the driving shaft and the centrifugal force developed by this rotation tends to make these weights assume a maximum distance from the axis of the driving shaft. This resists any change in the position of the parts and thereby exerts a locking force through the pinions 66 and with the gear 65 the latter, as before stated, being fastened to the disk 57. Then until this locking force is overcome this planetary system revolves as a unit around its axis. When the load on the driven member is so great that the locking force is insufficient then the weights 70 start a rotation around their own axes 67 thus enabling a slippage between the driving and driven members.

The amount of slippage is controlled among other things, first, by the speed of the driving member; second, by the size of the weights 70; third, by the distance of the weights from the axis of the driving shaft; and fourth, by the load applied at the driven end.

In Figs. 6 and 7 I have illustrated a slightly modified form of the construction shown in Figs. 4 and 5. The member 90 is fixed to the driving shaft and pivotally mounted at each end is a lever 91 provided with a weight 92 at one end and a brake 93 at the other, the latter being forced down upon the drum 94 by the centrifugal force of the weights 92, thereby locking the members of the planetary system. The drum, of course, is secured to the disk 57. It will be apparent that the drum 94, brakes 93, weights 92, lever 91 and member 90 correspond to the parts 65, 66, 67, 68, 69 and 70 of Figs. 4 and 5.

Figs. 6 and 7 also illustrate the application of means for manually throwing the clutch into ineffective position. To this end I employ a lever 95 adapted to move member 90, arms 91, etc., axially of the shaft 50 away from and into operative position with the drum 94. The arms 91 are limited in their movements by the pins 96 thereon engaging the slots 97 in the member 90. The drum 94 is provided with a conical or bevel portion 98 to enable the arms 91 to be moved into operative position with drum 94, it being understood that the outward and inward limits of movement of the weights 92 are such as to enable the axial movement above referred to to be effected.

What I claim is:—

1. In a power transmitting device, a driven member, a driving member, a gear connected to the driven member, a plurality of rotatable members meshing with said gear, and automatically acting means carried by the driving member for resisting the rotation of said rotatable members.

2. In a power transmitting device, a driven member, a driving member, a toothed member connected to the driven member, gear members carried by the driving member concentrically arranged with respect to and meshing with said toothed member, in combination with automatically acting means for resisting the relative rotation between said gear members and said toothed member whereby the toothed member is driven by the driving member.

3. In a power transmitting device, a driving member, a driven member, and connections for effecting varying relative speeds of said members, comprising a gear fixed to said driven member, rotatable worms carried by the driving member and concentrically arranged about and in substantially the same plane with said gear member, and centrifugal means carried by said driving member and adapted to resist the rotation of said worms whereby the driven member is rotated.

4. In a power transmitting device, a driving member, a driven member, and connections for effecting varying relative speeds between said members comprising a gear fixed to said driven member, automatic means for connecting said driving shaft with said gear to permit slippage, and means for throwing said automatic means at will into ineffective position to unclutch said driving and driven shafts.

5. In a power transmitting device, a driven member, a driving member, a gear connected to the driving member, a gear connected to the driven member, a plurality of rotatable members meshing with said gear, automatically acting means carried by the driving member for resisting the rotation of said rotatable member, and means for reducing the speed of said rotatable members when slippage occurs between said shafts.

6. In a power transmitting device, a driven member, a driving member, a gear connected to the driven member, a plurality of rotatable members meshing with said gear, a planetary system of gearing carried by said driving member for resisting the rotation of said rotatable member, and a planetary system connected to the aforesaid system and to said rotatable member for reducing the speed of the latter when slippage occurs between said shafts.

7. In a power transmitting device, a driven member, a driving member, a gear connected to the driven member, a plurality of rotatable members meshing with said gear, friction braking means carried by the driving member for resisting the rotation of said rotatable members, and means interposed between said braking means and said members for reducing the speed of the latter when slippage occurs between said shafts.

In testimony whereof I hereunto affix my signature.

CLARENCE T. ROGERS.